(12) United States Patent
Chen et al.

(10) Patent No.: US 8,443,371 B2
(45) Date of Patent: *May 14, 2013

(54) MANAGING OPERATION REQUESTS USING DIFFERENT RESOURCES

(75) Inventors: Alex Chen, Tucson, AZ (US); Angqin Bai, Tucson, AZ (US); Theodore Timothy Harris, Jr., Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1040 days.

This patent is subject to a terminal disclaimer.

(21) Appl. No.: 12/372,612

(22) Filed: Feb. 17, 2009

(65) Prior Publication Data

US 2009/0150897 A1    Jun. 11, 2009

Related U.S. Application Data

(63) Continuation of application No. 10/719,070, filed on Nov. 20, 2003, now Pat. No. 7,512,948.

(51) Int. Cl.
*G06F 9/46* (2006.01)
(52) U.S. Cl.
USPC ............................. 718/104; 718/100; 718/103
(58) Field of Classification Search .................. None
See application file for complete search history.

(56) References Cited

U.S. PATENT DOCUMENTS

| | | | |
|---|---|---|---|
| 5,006,983 A | 4/1991 | Wayne et al. | |
| 5,134,652 A | 7/1992 | Brown et al. | |
| 5,564,062 A | 10/1996 | Meaney et al. | |
| 5,862,360 A | 1/1999 | Meaney et al. | |
| 6,009,275 A | 12/1999 | DeKoning et al. | |
| 6,154,769 A | 11/2000 | Cherkasova et al. | |
| 6,353,869 B1 | 3/2002 | Ofer et al. | |
| 6,457,098 B1 * | 9/2002 | DeKoning et al. | 711/114 |
| 6,597,920 B2 | 7/2003 | Yegani et al. | |
| 7,237,016 B1 * | 6/2007 | Schober | 709/223 |
| 7,512,948 B2 | 3/2009 | Chen et al. | |
| 2001/0010053 A1 * | 7/2001 | Ben-Shachar et al. | 709/105 |
| 2003/0035142 A1 | 2/2003 | Kizaki | |

OTHER PUBLICATIONS

Office Action 1, Jan. 11, 2008, for U.S. Appl. No. 10/719,070, Total 16 pp.
Amendment 1, Apr. 11, 2008, for U.S. Appl. No. 10/719,070, Total 8 pp.
Final Office Action 1, Jul. 3, 2008, for U.S. Appl. No. 10/719,070, Total 16 pp.
Amendment 2, Sep. 3, 2008, for U.S. Appl. No. 10/719,070, Total 10 pp.
Notice of Allowance 1, Nov. 14, 2008, for U.S. Appl. No. 10/719,070, Total 13 pp.

* cited by examiner

*Primary Examiner* — Kenneth Tang
(74) *Attorney, Agent, or Firm* — William Konrad; Konrad, Raynes, Davda & Victor LLP

(57) ABSTRACT

Provided are a system and program for managing operation requests using different resources. In one embodiment, a first queue is provided for operations which utilize a first resource of a first and second resource. A second queue is provided for operations which utilize the second resource. An operation is queued on the first queue until the first resource is acquired. The first resource is released if the second resource is not also acquired. The operation is queued on the second queue when the first resource is acquired but the second resource is not. In addition, the first resource is released until the operation acquires both the first resource and the second resource.

19 Claims, 8 Drawing Sheets

MANAGING OPERATION REQUESTS USING DIFFERENT RESOURCES

RELATED APPLICATIONS

This application is a continuation application of copending parent application Ser. No. 10/719,070, filed Nov. 20, 2003, assigned to the assignee of the present application, and incorporated by reference in its entirety.

BACKGROUND OF THE INVENTION

1. Field of the Invention

The present invention relates to a method, system, and program for managing resources for competing tasks including operations, operation requests, or processes.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space often comprised of numerous hard disk drives connected in a loop architecture, otherwise referred to as a Direct Access Storage Device (DASD). Hosts may communicate Input/Output (I/O) requests to the storage space through the storage controller.

To maintain availability in the event of a failure, many storage controllers known in the prior art provide redundant hardware clusters. Each hardware cluster comprises a processor complex, cache, non-volatile storage (NVS), such as a battery backed-up Random Access Memory (RAM), and separate power supply to provide connection paths to the attached storage. The NVS in one cluster backs up write data from the cache in the other cluster so that if one cluster fails, the write data in the cache of the failed cluster is stored in the NVS of the surviving cluster. After one cluster fails, all Input/Output (I/O) requests would be directed toward the surviving cluster. When both clusters are available, each cluster may be assigned to handle I/O requests for specific logical storage devices configured within the physical storage devices.

In performing these and other tasks, a cluster can not only execute operations locally using the capabilities of the local cluster itself, but can also make a request to have an operation executed on a remote cluster in the storage controller system. Moreover, each storage controller may have an adapter to communicate over a network with a host computer or another storage controller. For example, the write instructions from the primary storage controller to a secondary storage controller may be generated by a processor of the adapter of the primary storage controller and issued over the network to the secondary storage controller.

Each operation may consume a significant portion of the resources of the cluster or adapter which is performing the requested operation. These resources may include the bandwidth of a bus or the bandwidth of a network connection, as well as the computational capabilities of the processors of the cluster or adapter.

Various techniques have been used to manage the allocation of resources so that operations proceed in an appropriate fashion. For example, operations may be assigned a priority such as low, medium or high. A high priority operation tends to receive a resource more quickly than a medium priority operation which tends to receive a resource more quickly than a low priority operation. However, in order to prevent higher priority operations from blocking the execution of all lower priority operations, various schemes have been used to ensure that a certain minimum number or proportion of lower priority operations are permitted to proceed. For example, the number of operations of each priority type may be counted and higher priority operations may be deferred on occasion to permit a minimum number or proportion of lower priority operations to proceed. Another scheme keeps track of how long a lower priority operation is caused to wait and may increase the priority of the operation as time passes until the operation has sufficient priority to proceed.

Further improvements in allocating resources amongst competing operations may be useful in a variety of applications.

SUMMARY OF ILLUSTRATED EMBODIMENTS

Provided is a method, system and program for managing tasks using different resources. In one embodiment, a first attempt is made to acquire a first resource for a task requiring both a first resource and a second resource. The task is enqueued on a first queue if the first attempt to acquire the first resource for the task fails. Upon acquiring the first resource in a subsequent attempt, the task is removed from the first queue and an attempt is made to acquire the second resource for the task. The task is enqueued on a second queue if the attempt to acquire the second resource fails and the first resource is released.

There are additional aspects to the present inventions. It should therefore be understood that the preceding is merely a brief summary of some embodiments and aspects of the present inventions. Additional embodiments and aspects of the present inventions are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
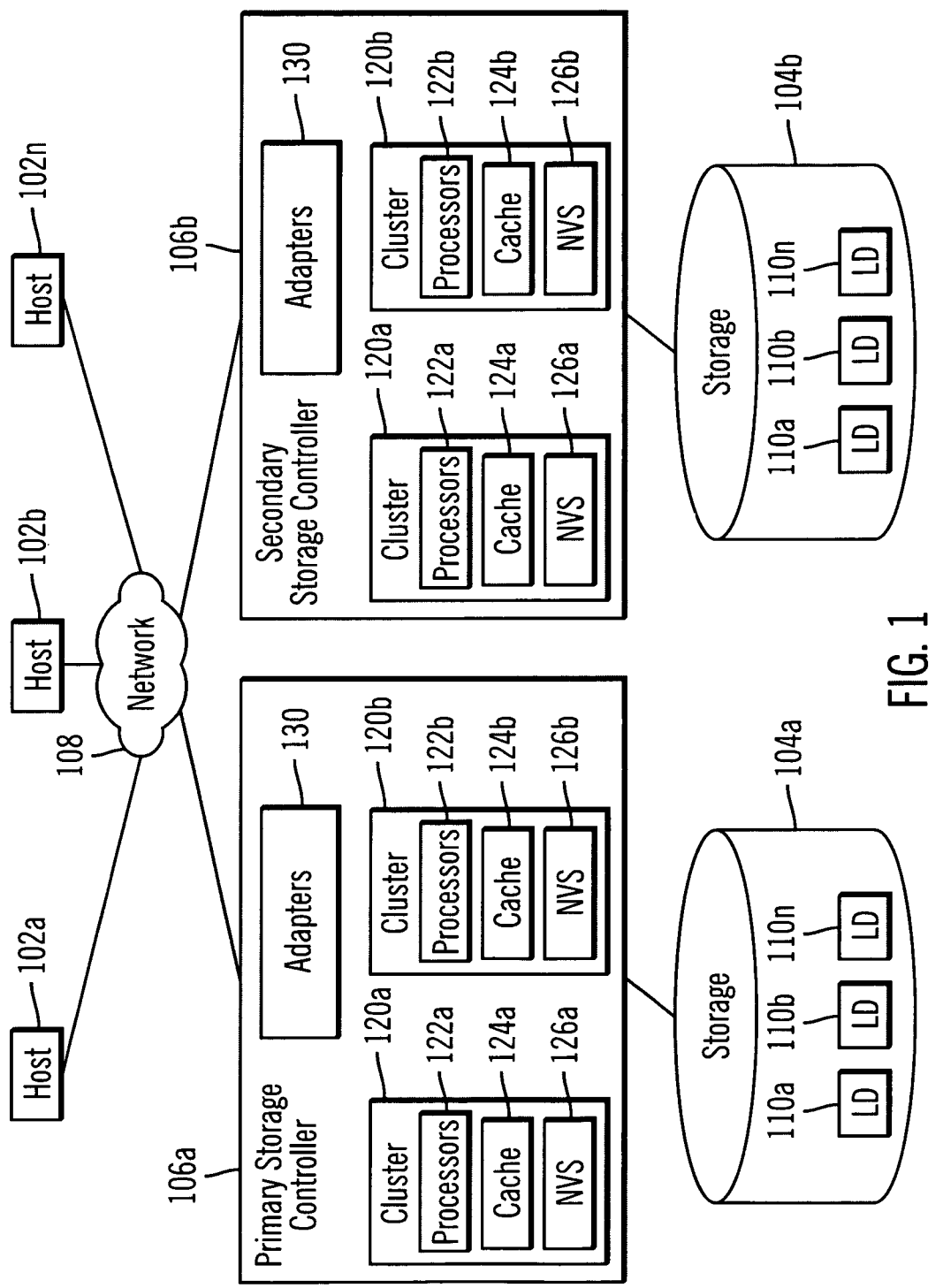
FIG. 1 illustrates an example of a computing environment in which aspects of the invention are implemented.

FIG. 1 illustrates a computing architecture in which aspects of the invention are implemented. One or more hosts 102a, 102b . . . 102n are in data communication with a primary storage system 104a, such as a DASD or any other storage system known in the art, via a primary storage controller 106a. In a similar manner, the hosts 102a, 102b . . . 102n are in data communication with a secondary storage system 104b, such as a DASD or any other storage system known in the art, via a secondary storage controller 106b. The host 102 may be any computing device known in the art, such as a server, mainframe, workstation, personal computer, hand held computer, laptop, telephony device, network appliance, etc. The storage controllers 106a, 106b and host system(s) 102 communicate via a network 108, which may comprise a Storage Area Network (SAN), Local Area Network (LAN), Intranet, the Internet, Wide Area Network (WAN), etc. The primary and secondary storage systems 104a, 104b may each be comprised of hard disk drives, tape cartridge libraries, optical disks, or any suitable non-volatile storage medium known in the art.

The primary and secondary storage systems 104a, 104b may each be arranged as an array of storage devices, such as a Just a Bunch of Disks (JBOD), DASD, Redundant Array of Independent Disks (RAID) array, virtualization device, etc. The primary and secondary storage controllers 106a, 106b may comprise any storage controller or server known in the art, such as the IBM Enterprise Storage Server (ESS) or any other storage controller known in the art. In certain implementations, the storage space in each of the storage systems 104a, 104b may be configured as a plurality of logical devices (LD) 110a, 110b . . . 110n.

The primary storage 104a or the logical devices 110a, 110b . . . 110n may each be divided into blocks of storage containing blocks of data, and the blocks of storage can be further divided into sub-blocks of storage that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The storage controllers 106a, 106b each include two separate clusters 120a, 120b of hardware components to provide redundancy for improved availability. Although the illustrated embodiment is described in connection with a storage controller having clusters, it is appreciated that the invention may be applicable to a variety of systems utilizing a single processor or multiple processors in which one processor can direct operations to be executed by another processor.

Each cluster 120a, 120b of the illustrated embodiment may be maintained on a separate power boundary, and includes a processor complex 122a, 122b, a cache 124a, 124b, and a non-volatile storage unit (NVS) 126a, 126b. The NVS 126a, 126b may comprise a battery backed-up RAM or any other type of non-volatile or volatile backup cache used to backup data in cache. The hosts 102a, 102b . . . 102n would submit application I/O requests directed to a target logical device (LD) 110a, 110b, 110n, including write data, to the cluster 120a, 120b to which the target logical device (LD) 110a, 110b, 110n is assigned. The NVS 126a, 126b in one cluster 120a, 120b is used to backup write data in the cache 124b, 124a in the other cluster 120b, 120a, e.g., NVS 126a backs up write data in cache 124b.

The storage controller 106a, 106b includes a read process for reading data, and a write process for writing data. The primary storage controller 106a also includes a sync process for transferring data from the primary storage controller 106a to remote storage, such as storage 104b at the secondary storage controller 106b. Each task or operation of each process is dispatched by an operation dispatcher, for execution, when the task acquires the controller resources needed to execute the task. The operation dispatcher may be implemented in software, firmware, hardware or a combination of these within the processor 122a, 122b or an adapter 130.

In certain implementations, the sync process may perform synchronization of data for the synchronous PPRC® and for PPRC® Extended Distance. In such cases, the sync process runs continuously for PPRC® Extended Distance, and starts up and completes for host writes for the synchronous PPRC®. In certain implementations, there may be multiple sync processes (e.g., different sync processes for synchronous PPRC® and for PPRC® Extended Distance or one sync process for each volume on primary storage 104a for PPRC® Extended Distance). Some IBM mirroring systems are described in IBM publication "Remote Copy: Administrator's Guide and Reference," IBM document no. SC35-0169-02 (IBM Copyright 1994, 1996).

In certain implementations, the read process, write process, and sync process are implemented as firmware. In certain implementations, the read process, write process and sync process are implemented as separate software programs for each process. In certain implementations, the read process, write process and sync process may be combined with each other or other software programs.

Secondary storage controller 106b provides one or more recovery systems access to disk storage, such as secondary storage 104b, which maintains back-up copies of all or a subset of the volumes of the primary storage 104a. Secondary storage may be a Direct Access Storage Device (DASD). Secondary storage 104b is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

In certain implementations, removable storage (instead of or in addition to remote storage, such as secondary storage 104b may be used to maintain back-up copies of all or a subset of the primary storage 104a, and the techniques of the invention transfer data to the removable storage rather than to the remote storage. The removable storage may reside at the primary storage controller 106a.

In certain implementations, the primary storage controller 106a and secondary storage controller 106b may be comprised of the IBM 3990, Model 6 Storage Controller, Enterprise Storage Server, or any other control unit known in the art.

In certain implementations, the primary storage controller 106a and/or secondary storage controller 106b may comprise any computing device known in the art, such as a mainframe, server, personal computer, workstation, laptop, handheld computer, telephony device, network appliance, virtualization device, storage controller, etc.

A primary site may include multiple primary storage controllers, primary storage, and host computers. A secondary site may include multiple secondary storage controllers, recovery systems, and secondary storage.

In certain implementations of the invention, data is maintained in volume pairs. A volume pair is comprised of a volume in a primary storage device (e.g., primary storage 104a) and a corresponding volume in a secondary storage device (e.g., secondary storage 104b) that includes a consistent copy of the data maintained in the primary volume. For example, primary storage 104a may include Volume1 and Volume2, and secondary storage 104b may contain corresponding Volume1 and Volume2. A primary storage controller may be provided to control access to the primary storage and a secondary storage controller may be provided to control access to the secondary storage.

In certain implementations, the primary storage controller 106a and secondary storage controller 106b communicate via communication paths, such as direct high speed transmission lines (e.g., an Enterprise System Connection (ESCON®), or Fiber connection (FICON) or Fibre Connection Protocol (FCP) link). However, the communication paths may be comprised of any other communication means known in the art, including network transmission lines, fiber optic cables, etc.

Each storage controller 106a, 106b of the illustrated embodiment further includes a network adapter 130 which permits each storage controller 106a, 106b to communicate with each of the hosts 102a, 102b . . . 102n as well as the other storage controller. For communication among the clusters and adapter of each storage controller 106a, 106b, each cluster 120a, 120b and adapter 130 has a mail manager process.

To write data to a target logical device 110a, 110b . . . 110n, a host such as host 102a issues a write command such as a SCSI (small computer system interface) embedded in a suitable network protocol frame as a Fibre Channel Protocol (FCP) frame to the primary storage controller 106a. The network adapter 130 of the primary storage controller 106a receives the write command and sends an appropriate write operation via its mail manager to the mail manager of the one of the clusters 120a, 120b of the primary storage controller 106a.

As previously mentioned, it is often useful for data to be written onto more than one storage device so that if the data is lost on one device, the data may be retrieved from the other device. One technique for achieving this redundant data writing is to pair a logical storage device 110a, 110b . . . 110n of one storage controller 106a with a logical storage device 110a, 110b . . . 110n of another storage controller 106b, for example. Thus, for example, the logical storage device 110a of the storage controller 106a may be paired with the logical storage device 110a of the storage controller 106b. In such an arrangement, the cluster 120a of the storage controller 106a can be programmed to recognize that a write operation to the logical storage device 110a of the storage controller 106a should be repeated on the logical storage device 110a of the storage controller 106b.

For synchronous PPRC®, before a host such as host 102a completes writing a chain of tracks to the primary storage controller 106a, all tracks in the chain will typically have also been transferred to the secondary storage controller 106b. In certain implementations, this transfer would be accomplished by a synchronization process which will typically have been completed before an acknowledgment of completion of the write process is sent to the host 102a.

For PPRC® Extended Distance, the host 102a will complete writing a track to the primary storage controller 106a without the track having been sent to the secondary storage controller 106b. After the track has been written to the primary storage controller 106b, the sync process will discover that an indicator corresponding to the track is set to indicate that the track is out of sync with a corresponding track at the secondary storage controller 106b and will send the track to the secondary storage controller 106b. That is, the track is sent asynchronously with respect to the track written by the host.

To send a track to the secondary storage controller 106b, the cluster 120a can send a mail message to the network adapter 130 of the primary storage controller 106a. In response, the network adapter 130 of the primary storage controller 106a can, in a manner similar to that of a host 102a, 102b . . . 102n issue a write command such as a SCSI (small computer system interface) command embedded in a suitable network protocol frame as a fiber channel Protocol (FCP) frame to the secondary storage controller 106b. The network adapter 130 of the secondary storage controller 106b receives the write command and sends an appropriate write operation via its mail manager to the mail manager of the one of the clusters 120a, 120b of the secondary storage controller 106b.

FIGS. 2-5B shows operations of an operation dispatcher of a cluster or adapter such as cluster 120a which can facilitate the allocation of a variety of resources to a variety of operations. In this example, two resources, resource A and resource B are being allocated for operations which utilize either resource A or both resource A and resource B. It is appreciated that more than two resources may be allocated utilizing the principles described herein. Also, in this example, resource A is a count of the number of permissible ongoing low and medium priority operations. This count is limited to a maximum number to limit the total number of low and medium priority operations which are permitted to be ongoing at a particular time. Once resource A is exhausted, no more low or medium priority operations will be dispatched until resource A is made available again by the completion of additional low or medium priority operations.

In this example, resource B is the bandwidth of a port and may be allocated in variable sized portions of the total bandwidth of the port. Once resource B is exhausted, that is the bandwidth of the port is fully utilized, no more operations which utilize resource B will be dispatched until resource B is made available again by the completion of operations which utilize the bandwidth of the port. Again, it is appreciated that other types of resources such as task control block (TCB) may be allocated as well. A TCB can function as a "ticket" needed for an operation to proceed in which the supply of TCB's is limited and is replenished by the completion of operations.

Figure 6:
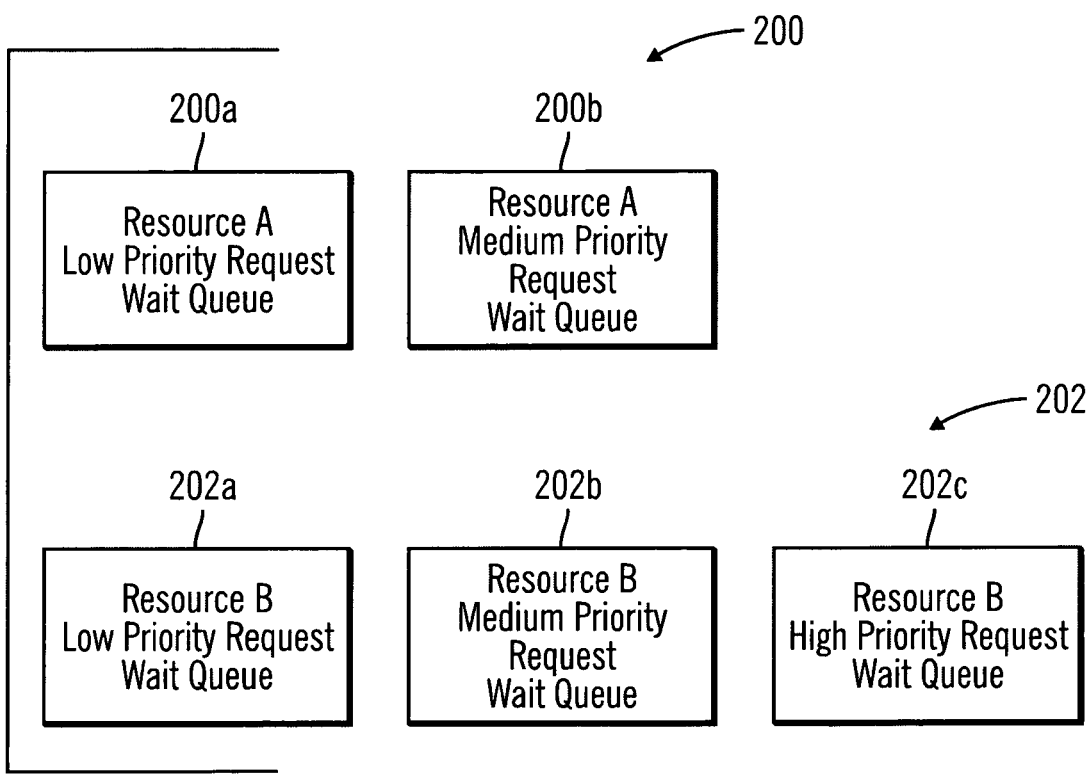
FIG. 6 illustrates queues for queuing requests which utilizes one or both of a first and second resource, in accordance with aspects of the invention.

In one aspect of the illustrated embodiment, to facilitate the allocation of resource A and resource B for operations which utilize resource A and resource B, the operation dispatcher maintains a first set of wait queues 200 for resource A and a second set of wait queues 202 for resource B as shown in FIG. 6. The first set of wait queues 200 is provided for operations which utilize resource A, which in the illustrated embodiment, is a maximum number of permissible ongoing low and medium priority operations. In one aspect of the illustrated embodiment, each set of wait queues for each resource includes a wait queue for operations of a particular priority. For example, one wait queue 200a of wait queue set 200 is used to queue low priority operations which are waiting to acquire resource A. Another wait queue 200b of wait queue set 200 is used to queue medium priority operations which are waiting to acquire resource A. Similarly, another wait queue 202a is used to queue low priority operations which are waiting to acquire resource B. Another wait queue 202b of wait queue set 200 is used to queue medium priority operations which are waiting to acquire resource B. Still another wait queue 202c of wait queue set 202 is used to queue high priority operations which are waiting to acquire resource B. In the illustrated embodiments, the wait queues 200a-202c are each FIFO (first in, first out) queues, although other types of queues may be used as well.

Figure 2:
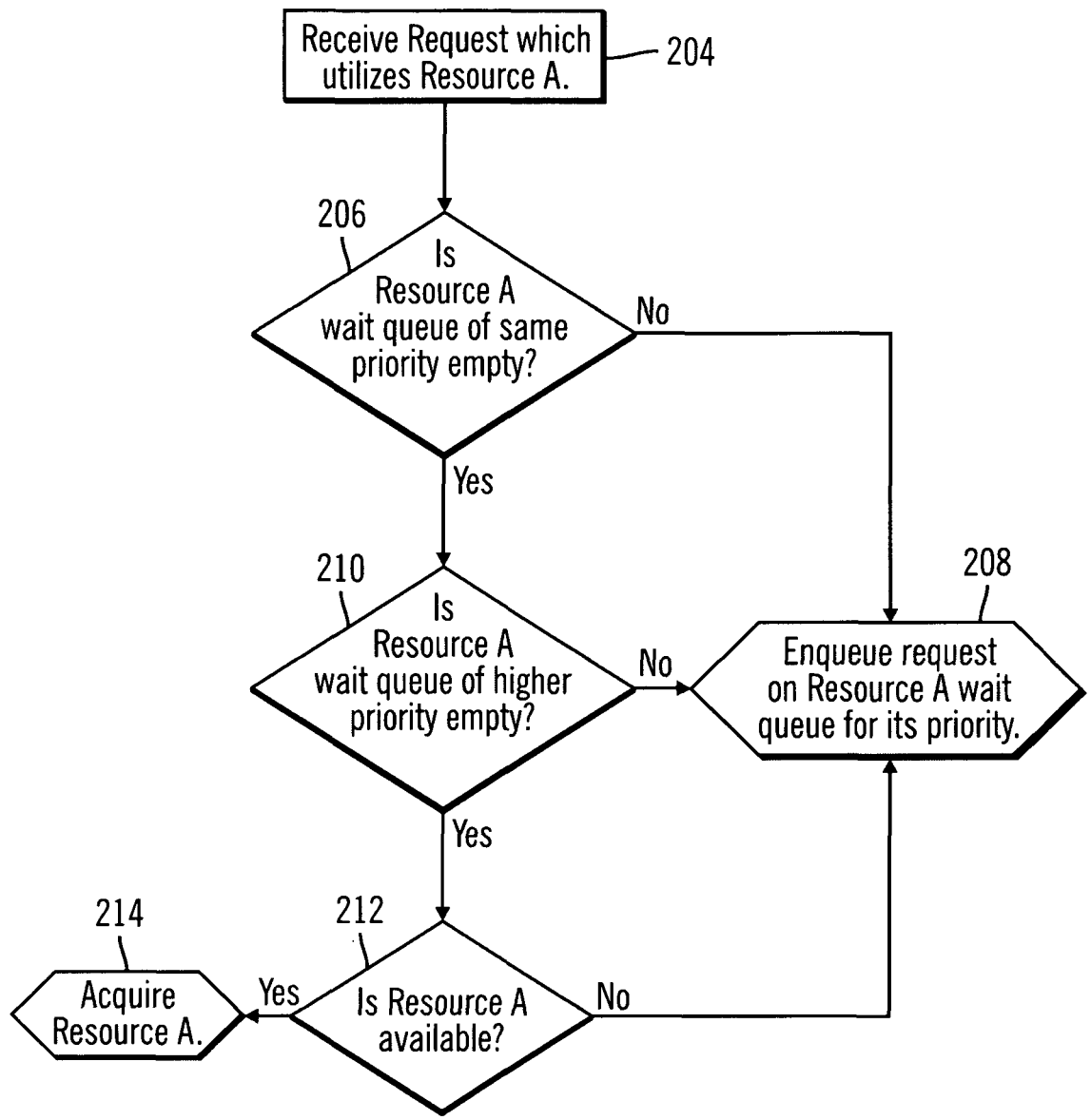
FIG. 2 illustrates queuing of requests when a request which utilizes a first resource is received, in accordance with aspects of the invention.

Referring first to the allocation operations of FIG. 2, when the operation dispatcher receives (block 204) for dispatching a new operation request which utilizes resource A, a determination is made (block 206) whether the wait queue for resource A for the priority of the received operation is empty. Thus, if the received operation is a low priority operation, the resource A low priority wait queue 200a is checked to see if other operations having the same priority, that is, low priority, are waiting to acquire resource A. If so, that is, if the low priority wait queue 200a is not empty, the received low priority operation is enqueued (block 208) at the end of the resource A wait queue of the same priority, that is, wait queue 200a in this example.

If the resource A wait queue for operations of the same priority is empty (block 206), a check (block 210) is made to determine whether the resource A wait queue set 200 wait queues for higher priority operations are empty. Thus, if the received operation is a low priority operation, the resource A medium priority wait queue 200b is checked to see if other operations having a higher priority, that is, medium priority in this example, are waiting to acquire resource A. If so, that is, if the medium priority wait queue 200b is not empty, the received low priority operation is enqueued (block 208) at the end of the resource A wait queue 200a for low priority resource A operations.

If the resource A wait queues for operations of higher priority are empty (block 206) as well, a determination (block 212) is made as to whether resource A is available for the received operation. If so, the received operation is permitted to acquire (block 214) resource A. If resource A is not available (block 212), the received low priority operation is enqueued (block 208) at the end of the resource A wait queue 200a for low priority resource A operations.

Once resource A has been acquired (block 214), the operation may be ready to be dispatched. Alternatively, the operation may need another resource such as a resource C to be dispatched. In one embodiment, the operation, once resource A is acquired, would be permitted to be dispatched when the next available resource C, such as a task control block (TCB), for example, becomes available and acquired.

Figure 3:
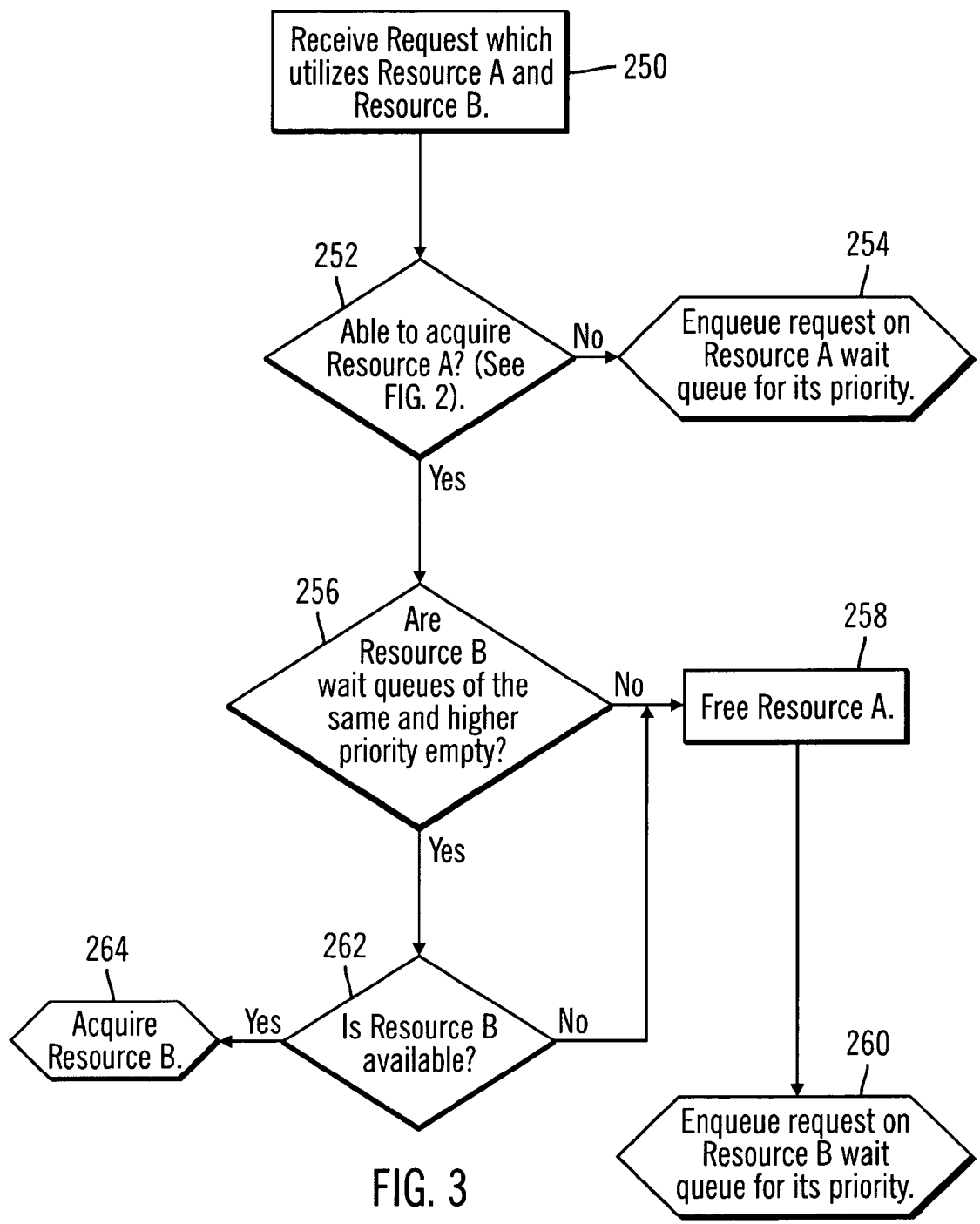
FIG. 3 illustrates queuing of requests when a request which utilizes both a first and second resource is received, in accordance with aspects of the invention.

However, some operations may utilize both resource A and resource B, both of which are to be allocated in accordance with priority. FIG. 3 shows the operations of the operation dispatcher for such operations. When an operation request which utilizes both resource A and resource B is received (block 250) by the operation dispatcher, an attempt (block 252) is made to acquire resource A for the received operation in the manner described above in connection with FIG. 2. Accordingly, if the received operation request is not able to acquire resource A, the received operation is enqueued (block 254) at the end of the resource A wait queue for operations of the same priority. Thus for example, if the received operation is a low priority operation, the operation will be enqueued at the end of the resource A wait queue 200a for low priority resource A operations if resource A could not be acquired.

If resource A was acquired (block 252), a determination is made (block 256) whether the wait queues of wait queue set 202 for resource B for the same priority of the received operation, or for a higher priority, are empty. Thus, if the received operation is a low priority operation, the resource B low priority wait queue 202a is checked to see if other operations having the same priority, that is, low priority, are waiting to acquire resource B. If so, that is, if the low priority wait queue 202a is not empty, the resource A is released (block 258) and the received low priority operation is enqueued (block 260) at the end of the resource B wait queue of the same priority, that is, wait queue 202a in this example.

If the resource B wait queue for operations of the same priority is empty, a check (block 256) is also made to determine whether the resource B wait queue set 202 wait queues for higher priority operations are also empty. Thus, if the received operation is a low priority operation, the resource B medium priority wait queue 202b and the resource B high priority wait queue 202c are checked to see if other operations having a higher priority, that is, medium priority or high priority in this example, are waiting to acquire resource B. If so, that is, if either of the medium priority wait queue 202b or the high priority wait queue 202c is not empty, the resource A is released (block 258) and the received low priority operation is enqueued (block 260) at the end of the resource B wait queue of the same priority, that is, wait queue 202a in this example.

If the resource B wait queues for operations of higher priority are empty (block 256) as well, a determination (block 262) is made as to whether resource B is available for the received operation. If so, the received operation is permitted to acquire (block 264) resource B. If resource B is not available (block 262), the resource A is released (block 258) and the received operation is enqueued (block 260) at the end of the resource B wait queue of the same priority, that is, wait queue 202a in this example for a received low priority operation.

Once resource B has been acquired (block 264), the operation request may be ready to be dispatched since resource A was previously acquired (block 252). Alternatively, the operation request may need another resource such as a resource C to be dispatched. In one embodiment, the operation, once resource A and resource B are acquired, would be permitted to be dispatched when the next available resource C, such as a task control block (TCB), for example, becomes available and acquired.

It is seen from the above, in one aspect, operation requests are enqueued on wait queues for operations of various priorities, when an operation request is unable to acquire the resources needed to complete the requested operation. In addition, acquired resources can be released when an operation request enqueued on a wait queue is unable to acquire other needed resources. In this manner, the released resources are made available to other operations while the enqueued operation request awaits the freeing of the needed resources.

Figure 4:
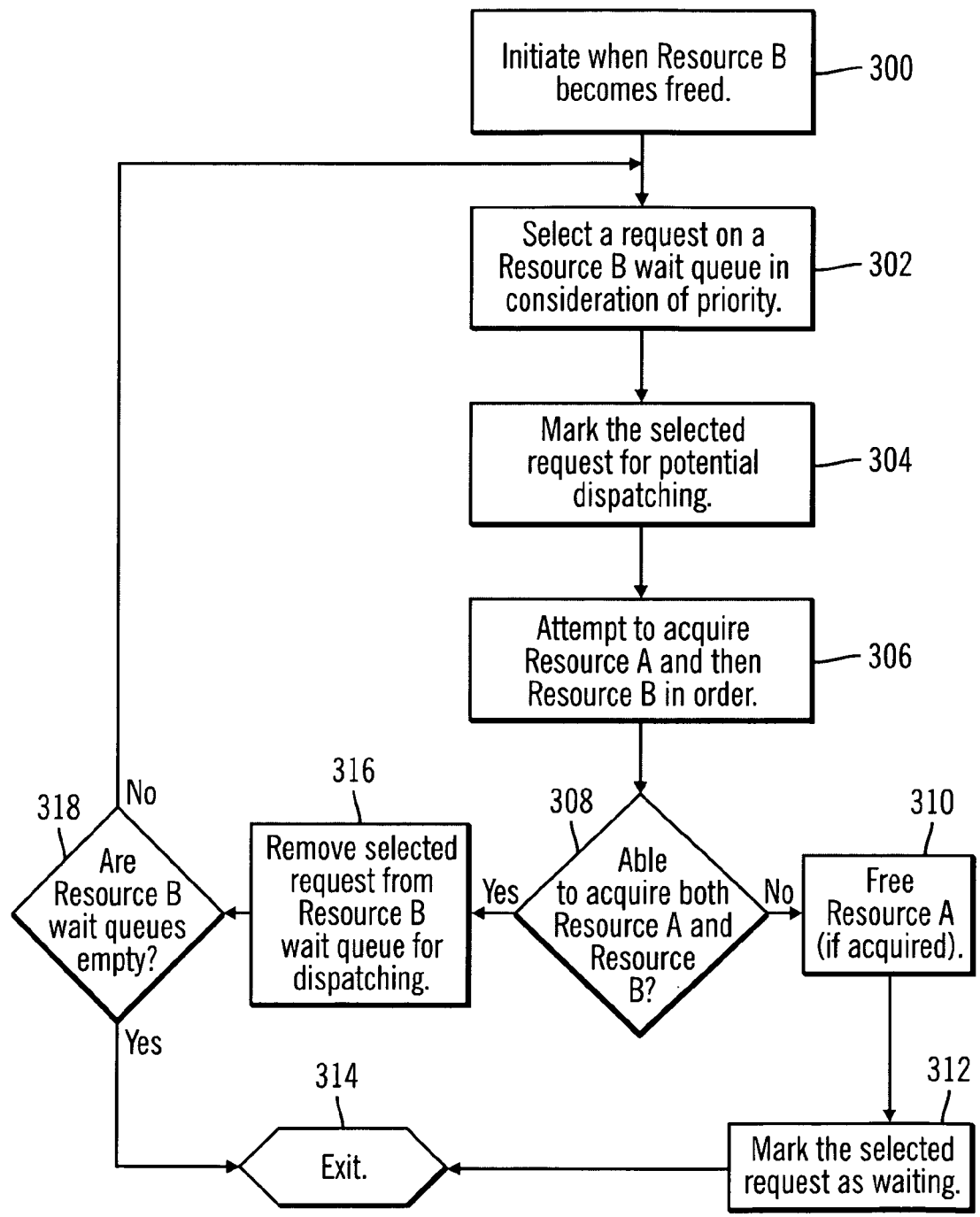
FIG. 4 illustrates dispatching a request from a queue when a second of two resources is freed, in accordance with aspects of the invention.

FIG. 4 shows operations of the operation dispatcher when a resource such as resource B becomes available. In one aspect, wait queues are "walked" to identify waiting operations enqueued on the wait queues and to dispatch those enqueued waiting operation requests as resource availability permits. In the illustrated embodiment, the process of FIG. 4 is initiated (block 300) when resource B becomes freed, typically by the completion of a prior operation which was utilizing resource B. Thus, for example, if an operation is utilizing 100 megabytes per second of a total port bandwidth of 1000 megabytes per second, a bandwidth portion of 100 megabytes per second may be released for use by other operations upon completion of that operation.

Upon a release (block 300) of resource B, one of the waiting operation requests enqueued on one of the wait queues of resource B wait queue set 202 is selected (block 302), taking into account the different priority levels of the waiting operations in the wait queue set 202. Various techniques may be used to select a waiting operation having a particular priority level. In general, a high priority operation may be selected more frequently than a medium priority operation which may be selected more frequently than a low priority operation. However, in order to prevent higher priority operations from blocking the selection of all lower priority operations, the number of operations of each priority type being dispatched may be counted and higher priority operations may be deferred as needed to permit a minimum number or proportion of lower priority operations to proceed. Another technique may be used in which the time a lower priority operation is caused to wait may be tracked and the priority of the operation may increase as time passes until the operation has sufficient priority to proceed. Other techniques may be used to select the priority level of the next operation to be selected. In the illustrated embodiment, once a priority level has been selected for the next operation to be selected, in general, the operation at the front of the wait queue for that priority level is selected since the wait queues of the illustrated embodiment are FIFO queues. However, other queues types and other techniques for selecting operations of different priority levels may be used as well.

Once one of the waiting operations enqueued on one of the wait queues of resource B wait queue set 202 is selected (block 302), taking into account the different priority levels of the waiting operations in the wait queue set 202, the selected operation is marked (block 304) for potential dispatching. In addition, an attempt (block 306) is made to acquire, in order, first resource A for the selected operation and then resource B for the selected operation. A determination (block 308) is made to determine if the attempt was successful.

If the attempt was unsuccessful, that is, resource A could not be acquired or resource A could be acquired but resource B could not be acquired for the selected operation, resource A is released (block 310) (if acquired), the selected operation is marked (block 312) as waiting, and the process of FIG. 4 is exited (block 314). In one aspect, the selected operation remains on the wait queue of the associated priority level of the wait queue set 202 for resource B and, in one embodiment, need not return to a wait queue of the wait queue set 200 to compete for resource A again.

If the attempt (block 306) to acquire both resource A and resource B, in order, is determined (block 308) to have been successful, the selected operation is removed (block 316) from the wait queue for dispatching. A determination (block 318) is made as to whether the wait queues of the resource B wait queue set 202 are empty. If not, that is, additional operations are enqueued on one or more of the wait queues of the resource B wait queue set 202, another one of the waiting operations enqueued on one of the wait queues of resource B wait queue set 202 is selected (block 302), taking into account the different priority levels of the waiting operations in the wait queue set 202. The process of steps 304-316 is repeated, acquiring (block 306) both resource A and resource B in order for the selected operation, removing (block 316) the selected operation from the wait queue for dispatching and selecting (block 302) another waiting operation on one of the wait queues of the resource B wait queue set 202 until either the operation dispatcher is unable (block 308) to acquire both resource A and resource B for the selected operation, or the wait queues of the resource B wait queue set 202 are empty (block 318). Once the wait queues of the resource B wait queue set 202 are empty (block 318), the process of FIG. 4 may be exited (block 314).

In one aspect, it is noted that once an operation request acquires resource A but fails to acquire resource B, the operation may be enqueued on the wait queue of the associated priority level of the wait queue set 202 for resource B and, in one embodiment, need not return to a wait queue of the wait queue set 200 to compete for resource A again.

Figure 5A:
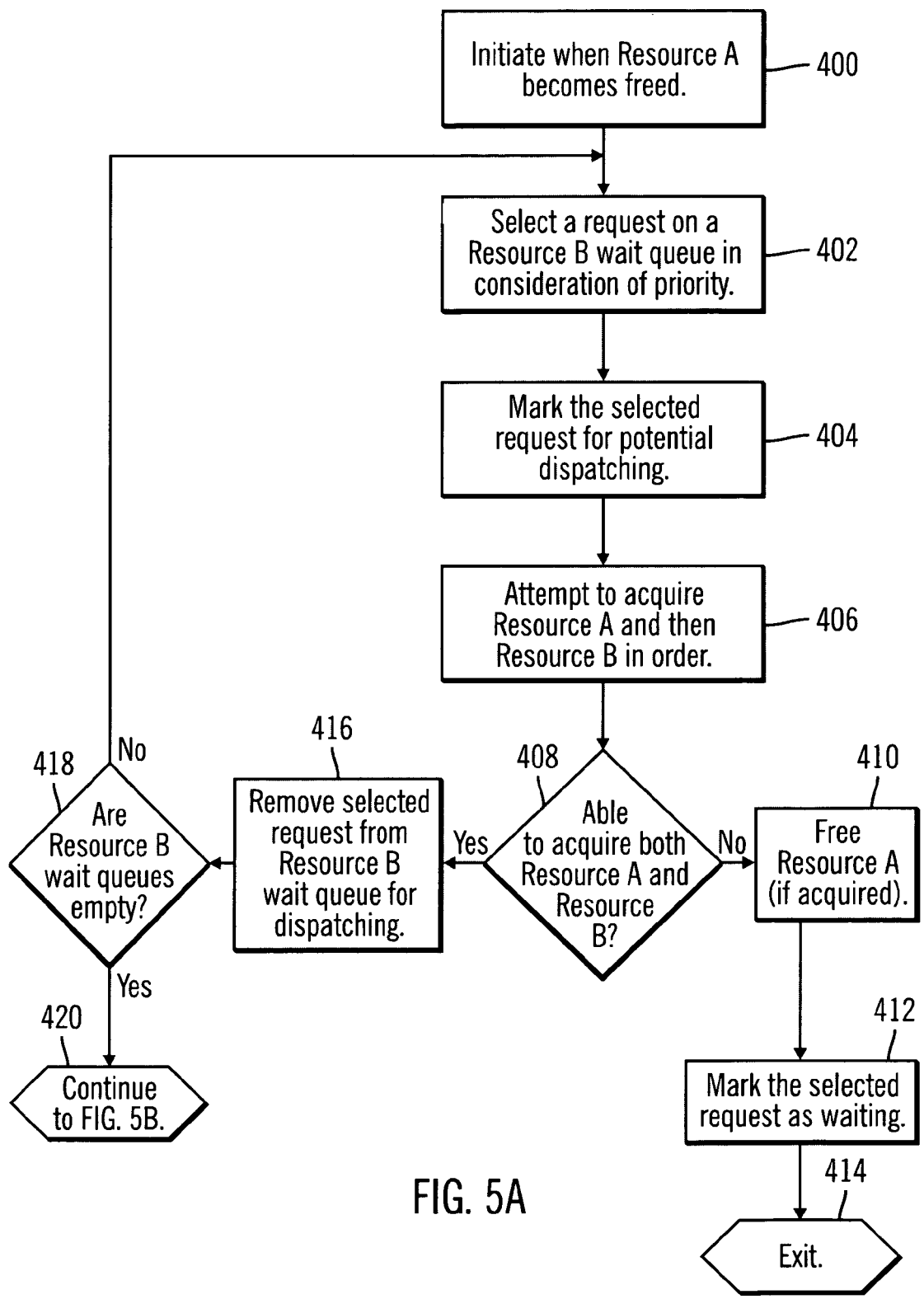
FIGS. 5A-5B illustrate dispatching a request from a queue when a first of two resources is freed, in accordance with aspects of the invention.
Figure 5B:
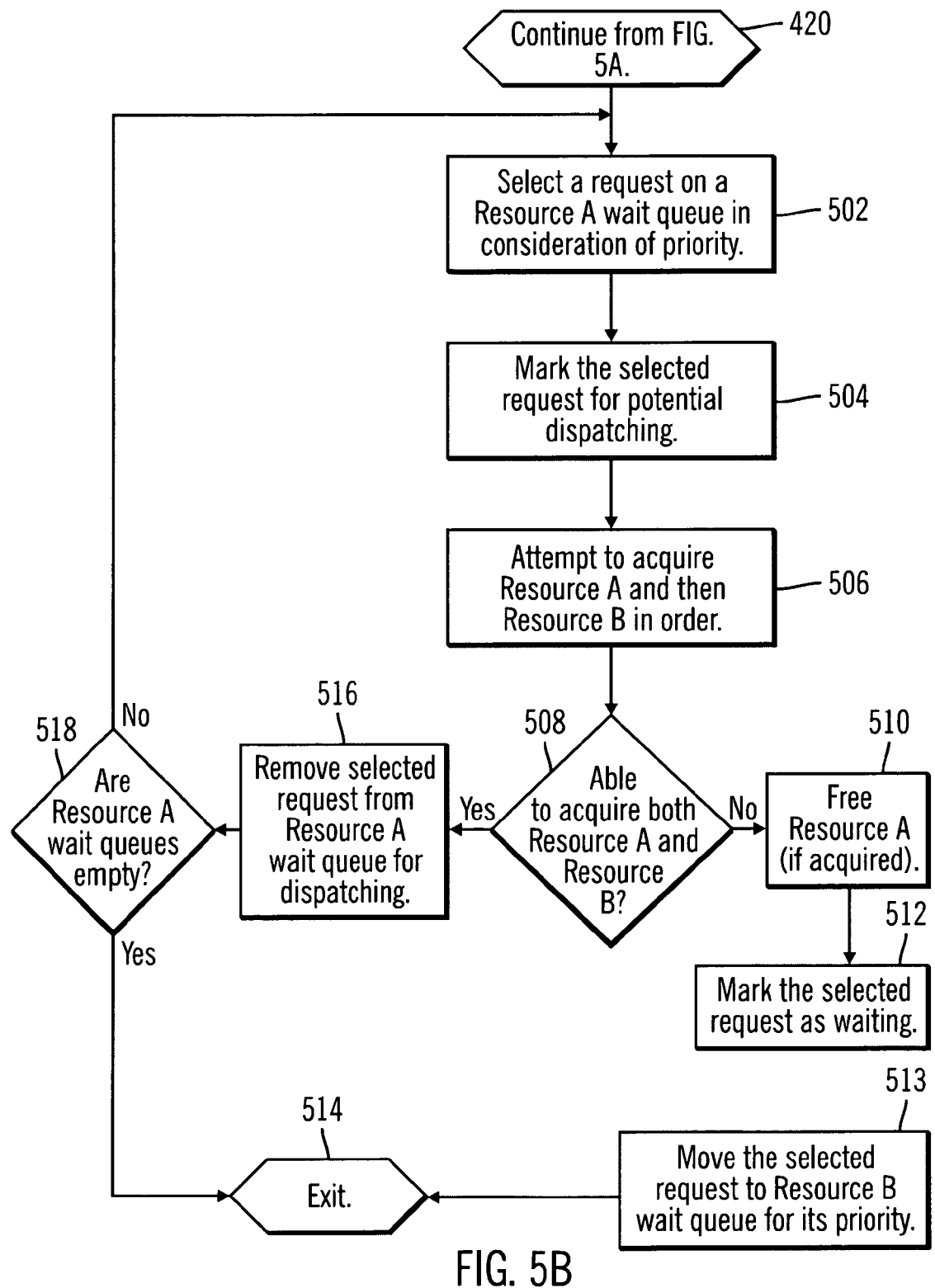

FIGS. 5A and 5B show operations of the operation dispatcher when a resource such as resource A becomes available. Here, the wait queues of both wait queue sets 200 and 202 are "walked" to identify waiting operations enqueued on the wait queues of sets 200 and 202 and to dispatch those enqueued waiting operations as resource availability permits. In the illustrated embodiment, in a manner similar to the process of FIG. 4, the process of FIG. 5A is initiated (block 400) when resource A becomes freed, typically by the completion of a prior operation which was utilizing resource A. As previously mentioned, in this example, resource A is a count of the number of permissible ongoing low and medium priority operations. Thus, resource A could be freed when a low or medium priority operation is completed.

Upon a release (block 400) of resource A, one of the waiting operations enqueued on one of the wait queues of resource B wait queue set 202 is selected (block 402), taking into account the different priority levels of the waiting operations in the wait queue set 202. Once one of the waiting operations enqueued on one of the wait queues of resource B wait queue set 202 is selected (block 402), the selected operation is marked (block 404) for potential dispatching. In addition, an attempt (block 406) is made to acquire, in order, first resource A for the selected operation and then resource B for the selected operation. A determination (block 408) is made to determine if the attempt was successful.

If the attempt was unsuccessful, that is, resource A could not be acquired or resource A could be acquired but resource B could not be acquired for the selected operation, resource A is released (block 410) (if acquired), the selected operation is marked (block 412) as waiting, and the process of FIG. 5A is exited (block 414). In one aspect, the selected operation remains on the wait queue of the associated priority level of the wait queue set 202 for resource B and, in one embodiment, need not return to a wait queue of the wait queue set 200 to compete for resource A again.

If the attempt (block 406) to acquire both resource A and resource B, in order, is determined (block 408) to have been successful, the selected operation is removed (block 416) from the wait queue for dispatching. A determination (block 418) is made as to whether the wait queues of the resource B wait queue set 202 are empty. If not, that is, additional operations are enqueued on one or more of the wait queues of the resource B wait queue set 202, another one of the waiting operations enqueued on one of the wait queues of resource B wait queue set 202 is selected (block 402), taking into account the different priority levels of the waiting operations in the wait queue set 202. The process of steps 404-416 is repeated, acquiring (block 406) both resource A and resource B in order for the selected operation, removing (block 416) the selected operation from the wait queue for dispatching and selecting (block 402) another waiting operation on one of the wait queues of the resource B wait queue set 202 until either the operation dispatcher is unable (block 408) to acquire both resource A and resource B for the selected operation, or the wait queues of the resource B wait queue set 202 are empty (block 418). Once the wait queues of the resource B wait queue set 202 are empty (block 418), the process of FIG. 5A continues (block 420, FIGS. 5A, 5B) with the process of FIG. 5B in which the wait queues of wait queue set 200 for resource A are walked.

In a manner similar to that described above in connection with FIG. 5A, one of the waiting operations enqueued on one of the wait queues of resource A wait queue set 200 is selected (block 502), taking into account the different priority levels of the waiting operations in the wait queue set 200. Once one of the waiting operations enqueued on one of the wait queues of resource A wait queue set 200 is selected (block 502), the selected operation is marked (block 504) for potential dispatching. In addition, an attempt (block 506) is made to acquire, in order, first resource A for the selected operation and then resource B for the selected operation. A determination (block 508) is made to determine if the attempt was successful.

If the attempt was unsuccessful, that is, resource A could not be acquired or resource A could be acquired but resource B could not be acquired for the selected operation, resource A is released (block 510) (if acquired), and the selected operation is marked (block 512) as waiting. If resource A could be acquired but resource B could not be acquired for the selected operation, the operation is moved (block 513) to the wait queue of the appropriate priority level of wait queue set 202 for resource B. The process of FIG. 5B is exited (block 514).

If the attempt (block 506) to acquire both resource A and resource B, in order, is determined (block 508) to have been successful, the selected operation is removed (block 516) from the wait queue for dispatching. A determination (block 518) is made as to whether the wait queues of the resource A wait queue set 200 are empty. If not, that is, additional operations are enqueued on one or more of the wait queues of the resource A wait queue set 200, another one of the waiting operations enqueued on one of the wait queues of resource A wait queue set 200 is selected (block 502), taking into account the different priority levels of the waiting operations in the wait queue set 200. The process of steps 504-516 is repeated, acquiring (block 506) both resource A and resource B in order for the selected operation, removing (block 516) the selected operation from the wait queue for dispatching and selecting (block 502) another waiting operation on one of the wait queues of the resource A wait queue set 200 until either the operation dispatcher is unable (block 508) to acquire both resource A and resource B for the selected operation, or the wait queues of the resource A wait queue set 200 are empty (block 518). Once the wait queues of the resource A wait queue set 200 are empty (block 518), the process of FIG. 5B may be exited (block 514).

Additional Implementation Details

The described techniques for managing resources may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain operations were described as performed by the processors of the processor complexes 122*a*, and 122*b* or the adapter 130. In alternative implementations, certain operations described as performed by the processors may be performed by a variety of computers, processors, and controllers.

The described implementations for resource management were described for use with systems deployed in a data environment where high availability is of value. However, those skilled in the art will appreciate that the resource management operations described herein may apply to computational and storage systems used for non-critical data.

In the described implementations, dual clusters were provided. In alternative implementations, there may be one or more than two clusters and resource management may be practiced in any one cluster.

The illustrated logic of FIGS. 2-5B show certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The variable N is used to denote any integer variable for certain of the described elements and may indicate a same or different integer value when used in different instances.

Figure 7:
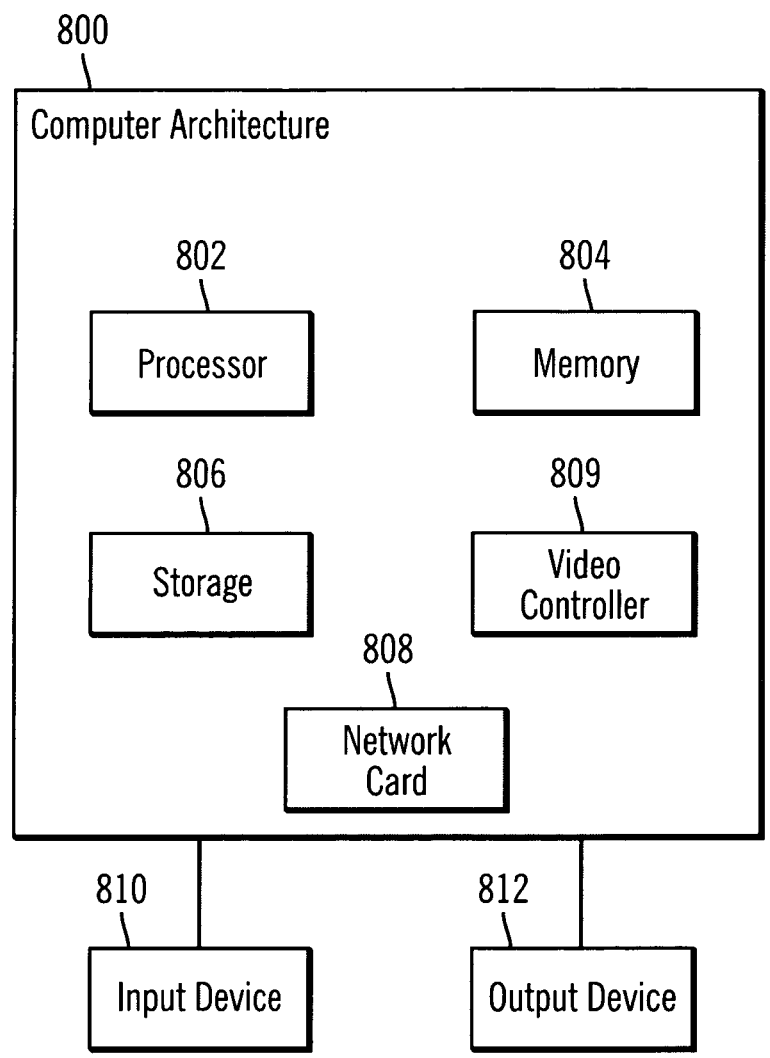
FIG. 7 illustrates an architecture of computing components in a network environment, such as the hosts, storage controllers, clusters, and any other computing devices.

FIG. 7 illustrates one implementation of a computer architecture 800 of the network components, such as the hosts and storage controller clusters shown in FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer readable storage medium having computer readable program code embodied therein that executes to perform operations, the operations comprising:
    attempting in a first attempt to acquire a first resource for a task requiring both a first resource and a second resource;
    enqueuing said task on a first queue if said first attempt to acquire said first resource for said task fails;
    acquiring in a second attempt said first resource for said task;
    removing said task from said first queue;
    attempting in a first attempt to acquire said second resource for said task;
    enqueing said task on a second queue if said first attempt to acquire said second resource for said task fails; and
    releasing said first resource for said task if said first attempt to acquire said second resource for said task fails.

2. The computer readable storage medium of claim 1 wherein said first task has a first priority, and wherein said first attempt to acquire said first resource fails when a second task having said first priority is enqueued on said first queue.

3. The computer readable storage medium of claim 2 wherein said first task has a first priority, said operations further comprising:
    attempting in a first attempt to acquire said first resource for a third task requiring said first resource and having a second priority higher than said first priority, and
    enqueuing said third task on a third queue if said first attempt to acquire said first resource for said third task fails; and
    wherein said first attempt to acquire said first resource for said first task fails when said third task having said second priority is enqueued on said third queue.

4. The computer readable storage medium of claim 3 wherein said first task has a first priority, and wherein said first attempt to acquire said second resource fails when a fourth task having said first priority is enqueued on said second queue.

5. The computer readable storage medium of claim 4 wherein said first task has a first priority, said operations further comprising:
    attempting in a first attempt to acquire said second resource for a fifth task requiring said second resource and having a second priority higher than said first priority, and
    enqueuing said fifth task on a fourth queue if said first attempt to acquire said second resource for said fifth task fails; and
    wherein said first attempt to acquire said second resource for said first task fails when said fifth task having said second priority is enqueued on said fourth queue.

6. The computer readable storage medium of claim 5, said operations further comprising:
    acquiring in a third attempt said first resource for said first task;
    attempting to acquire in a second attempt said second resource for said first task; and
    releasing said first resource for said first task if said second attempt to acquire said second resource for said task fails.

7. The computer readable storage medium of claim 5, said operations further comprising:
    acquiring in a third attempt said first resource for said first task;
    acquiring in a second attempt said second resource for said first task;
    removing said first task from said second queue; and
    dispatching said first task to be completed using said first and second resources.

8. The computer readable storage medium of claim 7, said operations further comprising:
    finding another task enqueued on one of said second and fourth queues for said second resource;
    acquiring said first resource for said other task;
    attempting to acquire said second resource for said other task;
    removing said other task from its queue if said attempt to acquire said second resource for said other task succeeds;
    dispatching said other task to be completed using said first and second resources if said attempt to acquire said second resource for said other task succeeds; and
    releasing said first resource for said other task if said attempt to acquire said second resource for said other task fails.

9. The computer readable storage medium of claim 7 wherein said third attempt is initiated by the second resource becoming free.

10. The computer readable storage medium of claim 7 wherein said third attempt is initiated by the first resource becoming free.

11. The computer readable storage medium of claim 7, said operations further comprising:
    after all tasks have been removed from said second and fourth queues, finding a next task enqueued on one of said first and third queues for said first resource;
    acquiring said first resource for said next task;
    attempting to acquire said second resource for said next task;
    removing said next task from its queue if said attempt to acquire said second resource for said next task succeeds;
    dispatching said next task to be completed using said first and second resources if said attempt to acquire said second resource for said next task succeeds; and
    releasing said first resource for said next task if said attempt to acquire said second resource for said next task fails.

12. A system comprising:
    means for attempting in a first attempt to acquire a first resource for a task requiring both a first resource and a second resource;
    means for enqueuing said task on a first queue if said first attempt to acquire said first resource for said task fails;
    means for acquiring in a second attempt said first resource for said task;
    means for removing said task from said first queue;
    means for attempting in a first attempt to acquire said second resource for said task;
    means for enqueing said task on a second queue if said first attempt to acquire said second resource for said task fails; and
    means for releasing said first resource for said task if said first attempt to acquire said second resource for said task fails.

13. The system of claim 12 wherein said first task has a first priority, and wherein said first attempt to acquire said first resource fails when a second task having said first priority is enqueued on said first queue.

14. The system of claim 13 wherein said first task has a first priority, said system further comprising:
   means for attempting in a first attempt to acquire said first resource for a third task requiring said first resource and having a second priority higher than said first priority, and
   means for enqueuing said third task on a third queue if said first attempt to acquire said first resource for said third task fails; and
   wherein said first attempt to acquire said first resource for said first task fails when said third task having said second priority is enqueued on said third queue.

15. The system of claim 14 wherein said first task has a first priority, and wherein said first attempt to acquire said second resource fails when a fourth task having said first priority is enqueued on said second queue.

16. The system of claim 15 wherein said first task has a first priority, said system further comprising:
   means for attempting in a first attempt to acquire said second resource for a fifth task requiring said second resource and having a second priority higher than said first priority, and
   means for enqueuing said fifth task on a fourth queue if said first attempt to acquire said second resource for said fifth task fails; and
   wherein said first attempt to acquire said second resource for said first task fails when said fifth task having said second priority is enqueued on said fourth queue.

17. The system of claim 16 further comprising:
   means for acquiring in a third attempt said first resource for said first task;
   means for attempting to acquire in a second attempt said second resource for said first task; and
   means for releasing said first resource for said first task if said second attempt to acquire said second resource for said task fails.

18. The system of claim 16 further comprising:
   means for acquiring in a third attempt said first resource for said first task;
   means for acquiring in a second attempt said second resource for said first task;
   means for removing said first task from said second queue; and
   means for dispatching said first task to be completed using said first and second resources.

19. The system of claim 18 further comprising:
   means for finding another task enqueued on one of said second and fourth queues for said second resource;
   means for acquiring said first resource for said other task;
   means for attempting to acquire said second resource for said other task;
   means for removing said other task from its queue if said attempt to acquire said second resource for said other task succeeds;
   means for dispatching said other task to be completed using said first and second resources if said attempt to acquire said second resource for said other task succeeds; and
   means for releasing said first resource for said other task if said attempt to acquire said second resource for said other task fails.

* * * * *